(12) United States Patent
Sood et al.

(10) Patent No.: US 7,624,271 B2
(45) Date of Patent: Nov. 24, 2009

(54) COMMUNICATIONS SECURITY (75) Inventors: Kapil Sood, Hillsboro, OR (US); Jesse Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 11/090,822

(22) Filed: Mar. 24, 2005

(65) Prior Publication Data
US 2006/0218398 A1 Sep. 28, 2006

(51) Int. Cl.
*H04L 9/32* (2006.01)
(52) U.S. Cl. .......................... 713/171; 380/44; 380/273
(58) Field of Classification Search .................. 380/44, 380/270, 273; 713/171
See application file for complete search history.

(56) References Cited

U.S. PATENT DOCUMENTS

| | | | | |
|---|---|---|---|---|
| 7,263,357 | B2 * | 8/2007 | Lee et al. .................. | 455/432.1 |
| 7,350,077 | B2 * | 3/2008 | Meier et al. .................. | 713/171 |
| 7,451,316 | B2 * | 11/2008 | Halasz et al. ............... | 713/171 |
| 7,558,388 | B2 * | 7/2009 | Ptasinski ..................... | 380/270 |
| 2004/0103282 | A1 * | 5/2004 | Meier et al. .................. | 713/171 |
| 2005/0107081 | A1 * | 5/2005 | Kang et al. ............... | 455/426.2 |
| 2005/0152305 | A1 * | 7/2005 | Ji et al. ........................ | 370/328 |
| 2005/0220054 | A1 * | 10/2005 | Meier et al. .................. | 370/331 |
| 2005/0254653 | A1 * | 11/2005 | Potashnik et al. ........... | 380/270 |
| 2006/0013398 | A1 * | 1/2006 | Halasz et al. ............... | 380/273 |
| 2006/0067526 | A1 * | 3/2006 | Faccin et al. ................. | 380/46 |
| 2006/0083377 | A1 * | 4/2006 | Ptasinski ..................... | 380/270 |
| 2006/0121883 | A1 * | 6/2006 | Faccin ......................... | 455/411 |
| 2006/0187878 | A1 * | 8/2006 | Calhoun et al. ............. | 370/331 |
| 2007/0288997 | A1 * | 12/2007 | Meier et al. ..................... | 726/4 |
| 2008/0112363 | A1 * | 5/2008 | Rahman et al. ............. | 370/331 |

OTHER PUBLICATIONS

Altunbasak et al., Alternative Pair-wise Key Exchange Protocols for Robust Security Networks (IEEE 802.11i) in Wireless LANs, 2004, IEEE.*
N. Cam-Winget, et al., "Just-In-Time 2 Phase Association—TGr Proposal for Fast BSS Transitions," Oct. 2004, doc.: IEEE 802.11-04/1170-00, 60 pgs.
N. Cam-Winget, et al., "802.11 TGr Just-In-Time (JIT) 2-Phase Association Proposal," Dec. 17, 2004, doc.: IEEE 802.11-04/1486r0, 54 pgs.

* cited by examiner

*Primary Examiner*—David García Cervetti
(74) *Attorney, Agent, or Firm*—Schwabe, Williamson & Wyatt, P.C.

(57) ABSTRACT

A method of authenticating a device's access to a communications node is disclosed. The method of operation includes the communications node generating a first value for use in the derivation of a first encryption key, the first encryption key being at least partially used to authenticate the device's access to the communications node in a first communications exchange. The method of operation includes the communications node modifying the first value, independent of the device, to create a second value. The method includes the communications node using the second value in authenticating the device's access to the communications node in a second communications exchange. Embodiments of the present invention include but are not limited to communications nodes and devices, subsystems, and systems equipped to operate in the above-described manner.

22 Claims, 6 Drawing Sheets

COMMUNICATIONS SECURITY

FIELD

Disclosed embodiments of the present invention relate to the field of communications, and more particularly to wireless networking.

BACKGROUND

Communications nodes in a wireless network typically communicate using radio frequency signals, although other forms of electromagnetic radiation may be utilized as well. As wireless networks operate over an air interface, transmissions among wireless communications nodes and wireless devices may be susceptible to reception by unauthorized devices. Devices not authorized to access a wireless communications node may also attempt to access such a node. Unauthorized access may be attempted by replaying a portion of a transmission received from a device authorized to access the communications node in a replay attack, among other methods. Wireless devices that access communications nodes may have low computing power capabilities due to a variety of factors, such as the size of the device or low power consumption characteristics. As wireless networks continue to be deployed, potential issues regarding the security of such wireless networks will continue to grow.

BRIEF DESCRIPTION OF THE DRAWINGS

Embodiments of the present invention will be described by way of the accompanying drawings in which like references denote similar elements, and in which.

DETAILED DESCRIPTION OF ILLUSTRATIVE EMBODIMENTS

Embodiments of the present invention include but are not limited to a method of authenticating a device's access to a communications node. The method of operation includes the communications node generating a first value for use in the derivation of a first encryption key, the first encryption key being at least partially used to authenticate the device's access to the communications node in a first communications exchange. The method of operation includes the communications node modifying the first value, independent of the device, to create a second value. The method includes the communications node using the second value in authenticating the device's access to the communications node in a second communications exchange. Embodiments of the present invention include but are not limited to communications nodes and devices, subsystems, and systems equipped to operate in the above-described manner.

The following discussion is primarily presented in the context of wireless networks. It is understood that the principles described herein may apply to other communications networks.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 1:
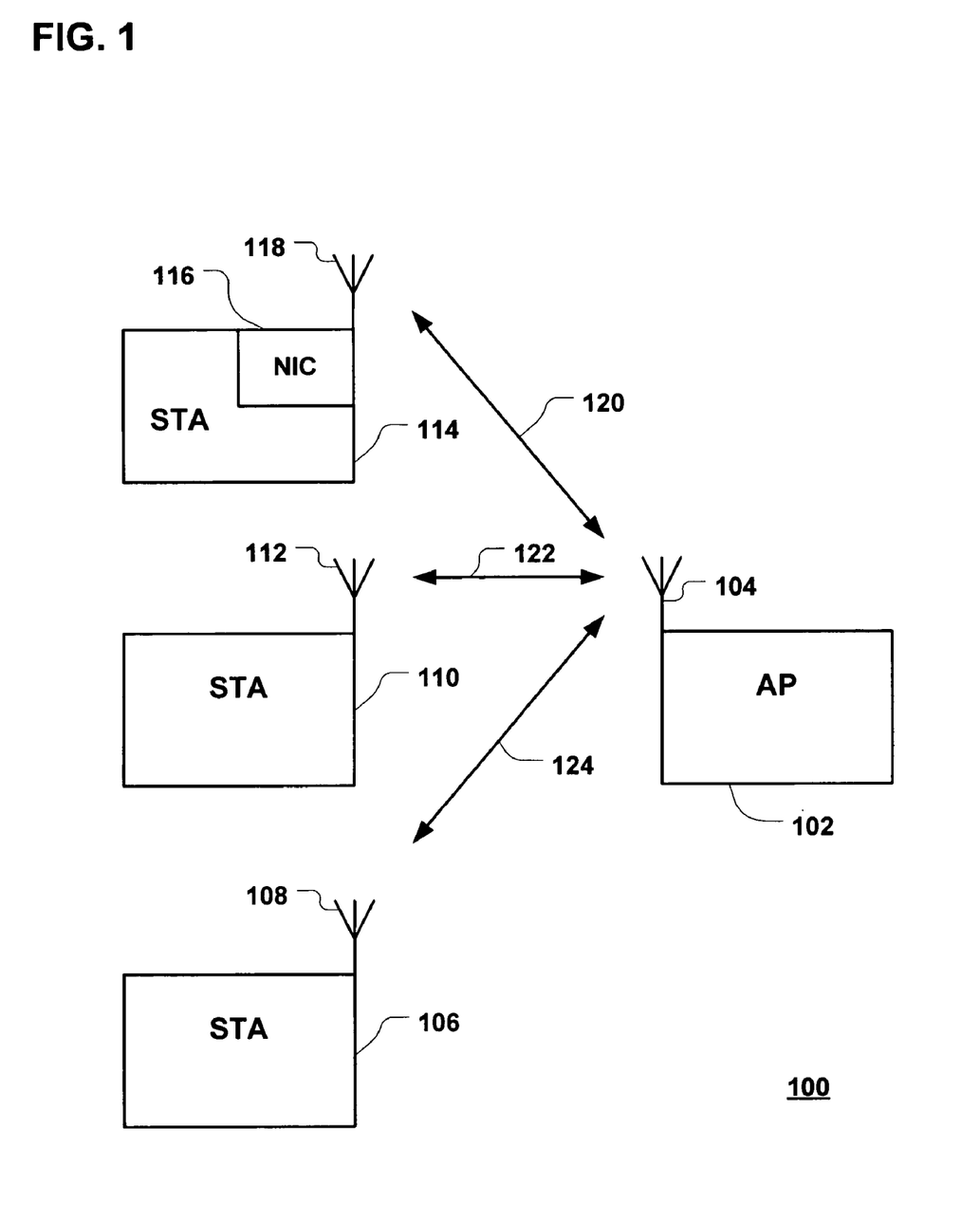
FIG. 1 is a block diagram illustrating some of the functional blocks of a wireless network, in accordance with an embodiment of this invention.

FIG. 1 is a block diagram illustrating some of the functional blocks of a wireless network, in accordance with an embodiment of this invention. As illustrated, wireless network 100 may comprise of access point (AP) 102, and stations (STA) 106, 110, and 114. In some embodiments, AP 102, and STAs 106, 110, and 114 may include antennas 104, 108, 112, and 118, respectively. In alternative embodiments, other means for relaying signals between an AP and a STA may be used, for example, infrared transmitters and detectors. AP 102 may serve as a point of network access for STAs 106, 110, and 114. In some embodiments, the network accessed by a STA may be a local area network (LAN) with an AP being connected to such a network via a fixed line or some other means, including a wireless link (not shown). In other embodiments, other types of networks may be involved. In various embodiments, AP 102 and at least one of STAs 106, 110, or 114, may be compliant or compatible with the Institute of Electrical and Electronics Engineers (IEEE) 802.11 standard, IEEE std. 802.11-1999, reaffirmed Jun. 12, 2003, forming an 802.11 network. The term, 802.11, will be used herein to refer to all IEEE 802.11 standards, including past, present, and future versions.

In various applications, one or more STAs 106, 110, and 114 may comprise a network interface card (NIC), a cellular phone, a personal digital assistant (PDA), a handheld computer, a laptop computer, a personal computer, a set-top box, a handheld gaming device, a game console, a video display, a video camera, or any such device that may make use of network access.

While the embodiment in FIG. 1 shows one AP, other embodiments may include a greater number of APs. In various embodiments, one AP may serve as a hub in a hub-and-spoke configuration. In various other embodiments, multiple APs may form a mesh network in a mesh configuration. An STA may include a NIC, as in STA 114 including NIC 116, that provides STA 114 with the functionality to access a wireless network. While the embodiment in FIG. 1 shows three STAs, other embodiments may include a greater or lesser number of STAs.

AP 102 may communicate with STAs 106, 110, and 114 via signals 124, 122, and 120, respectively. Signals 124, 122, and 120 may utilize one of a number of available channels. A channel in a communications medium may be defined in any number of ways, including a frequency band, a time period, a coding scheme (for example, in embodiments making use of spread spectrum techniques), a combination of spatial and other information, and the like, including multiple combinations of differentiating a communications medium. Channels are defined in various ways for particular communications protocols, and various embodiments may make use of various communications protocols.

A device's access to a communications node, such as STA 106's access to AP 102, may be subject to passing an authentication procedure. Such a procedure may apply to any of the STAs shown in FIG. 1, with STA 106 being chosen as an example for illustration purposes. Such an authentication procedure may include AP 102 generating a first value for use in the derivation of a first encryption key, the first encryption key being at least partially used to authenticate STA 106's access to AP 102 in a first communications exchange. AP 102 may also modify, independent of STA 106, the first value to create a second value. In some embodiments, AP 102's modification of the first value may comprise incrementing the first value, independent of STA 106. In various other embodiments, AP 102's modification of the first value may comprise changing the first value in another defined manner. AP 102 may use the second value in authenticating STA 106's access to AP 102 in a second communications exchange.

In some embodiments, the communications node may comprise an 802.11 compliant or compatible access point. In other embodiments, a transmission protocol other than that specified by the 802.11 standard may be utilized. In some embodiments, the device may be an 802.11 compliant or compatible station. In other embodiments, a transmission protocol other than that specified by the 802.11 standard may be utilized.

AP 102 may also use the second value to derive a second encryption key, the second encryption key being at least partially used to authenticate STA 106's access to AP 102 in the second communications exchange. The first value may be a random or a pseudo-random value. The first encryption key may be a Pair-wise Transient Key (PTK). In various embodiments, the authentication process may be performed in whole or in part under the IEEE 802.11i standard, IEEE std. 802.11i-2004, approved Jun. 24, 2004. The term, 802.11i, will be used herein to refer to all IEEE 802.11i standards, including past, present, and future versions. For example, the derivation of the first encryption key may be an 802.11i PTK derivation in some embodiments.

In various embodiments, a device's access to a communications node, such as STA 106's access to AP 102, may be authenticated in the following manner: STA 106 may communicate with AP 102 in a first communications exchange, with STA 106 being authenticated to AP 102 using a first encryption key derived from a first value generated by AP 102. STA 106 may modify, independent of AP 102, the first value to create a second value. STA 106 may communicate with AP 102 in a second communications exchange, using the second value, with STA 106 being authenticated to AP 102 using a copy of the second value independently generated by AP 102. In some embodiments, STA 106's modification of the first value may comprise incrementing the first value independent of AP 102. In various other embodiments, STA 106's modification of the first value may comprise changing the first value in another defined manner.

In some embodiments, security measures in a STA to AP connection may be implemented under the 802.11i standard. In various other embodiments, security measures in a STA to AP connection may be implemented under other standards or under a procedure that is not a recognized standard. Security measures in a communications system may help protect the system against access by unauthorized STAs and APs, which can cause denial of service, replay, session hijacking, and other types of attacks. In various embodiments of the invention, some of the operations disclosed herein may facilitate the implementation of security measures, such as those of 802.11i. Various embodiments of the invention may assist in decreasing the implementation time needed for certain security measures in some cases, one example of which may include when a STA roaming among APs. Various embodiments of the invention may facilitate a STA and an AP in predetermining a value used in implementing security measures, such as an ANounce value, in some cases. Such facilitation of the predetermination of values may assist a device, such as a STA, in implementing security measures. For example, this may assist the device in being able to pre-schedule a computation prior to the time when a STA's access to an AP needs to be authenticated. In some STAs, such as those with low computing power capabilities, this ability to pre-schedule computational tasks may facilitate a faster implementation of a security measure than might otherwise be possible.

Figure 2:
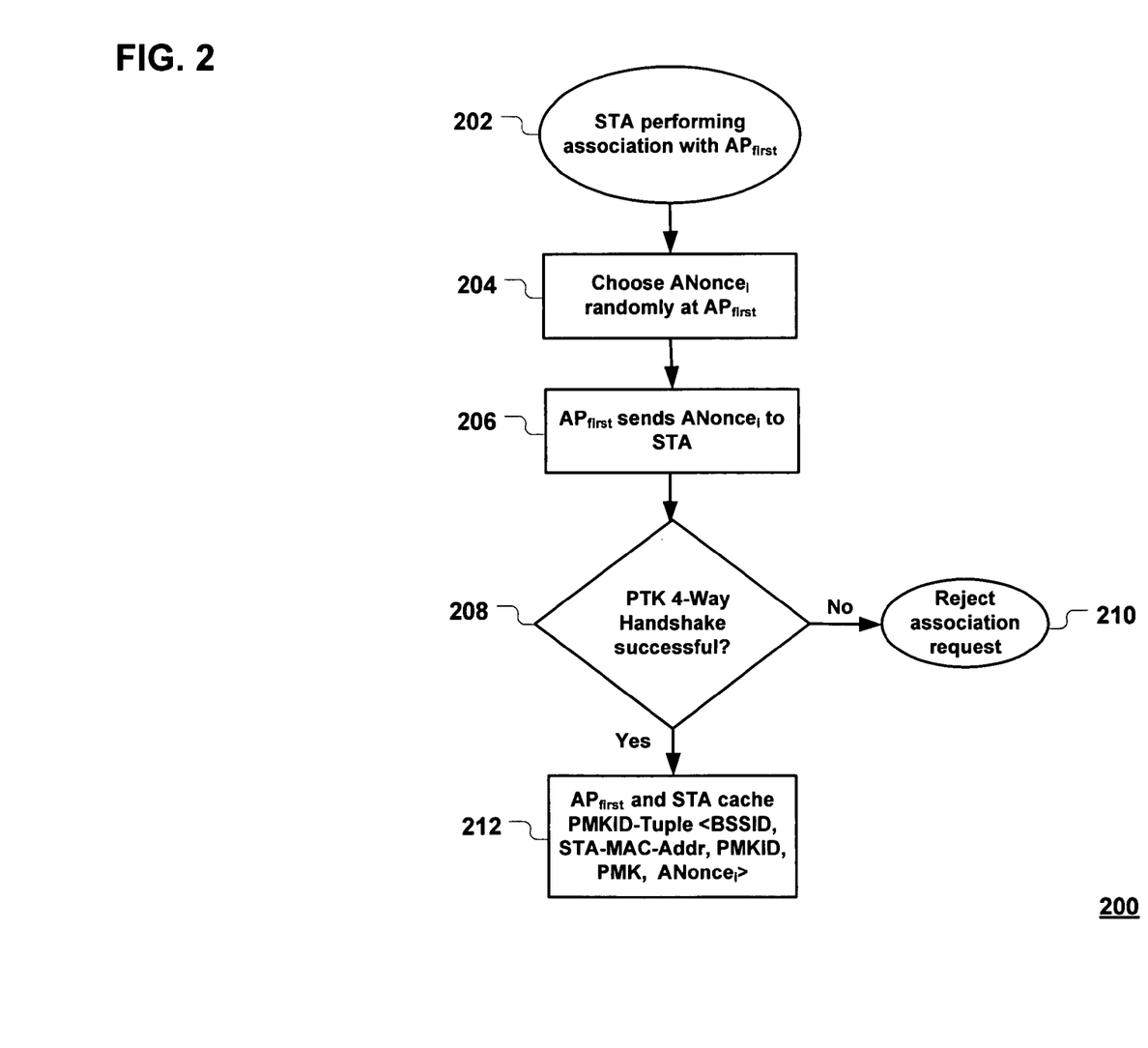
FIG. 2 is a flow diagram illustrating a portion of a method of operation in a communications node, in accordance with an embodiment of this invention.

FIG. 2 is a flow diagram illustrating a portion of a method of operation 200 in a communications node, in accordance with an embodiment of this invention. The operations illustrated in FIG. 2 may comprise operations in authenticating a communications device to a communications node. The operations illustrated in FIG. 2 in the context of APfirst may be operations of or involving an Authenticator residing on a communications node, with the communications node comprising, in this example embodiment, an AP. In various embodiments, the Authenticator may reside on another device coupled to an AP. It is the Authenticator residing on APfirst that is performing the operations indicated in terms of APfirst in the example embodiment in FIG. 2. In various embodiments, the Authenticator may not reside on an AP, and thus the term, Authenticator, may take the place of the term, APfirst, in describing the operations of such embodiments. Similarly, the operations illustrated in FIG. 2 in the context of a STA may be operations of a Supplicant residing on a communications device, such as a STA. In some embodiments, the Supplicant may not reside on a STA, but may, for example, reside on a device coupled to a STA.

As illustrated, the method may include block 202, where a communications device (here, a STA) is performing an association with a communications node (here, an AP denoted APfirst). An association comprises a STA forming a connection with an AP. Another operation may include APfirst choosing a random or pseudo-random value, denoted an ANonce, as illustrated by block 204. In block 204, this ANonce is referred to as ANoncei. The operation of APfirst sending ANoncei to the STA may be included in the method, as illustrated by block 206.

An operation that involves a message exchange between the STA and APfirst to derive a PTK may take place in a PTK 4-Way Handshake, the success of which may be determined, as illustrated by block 208. If the PTK 4-Way Handshake is not successful, the STA's association request to APfirst may be rejected, as illustrated by block 210. If the PTK 4-Way Handshake is successful, APfirst and the STA will both cache or store the Pair-wise Master Key Identifier (PMKID) Tuple, which may include the Basic Service Set Identifier (BSSID), the STA Medium Access Control (MAC) Address (Addr), the PMKID, the Pair-wise Master Key (PMK), and ANoncei: PMKID-Tuple<BSSID, STA-MAC-Addr, PMKID, PMK, ANoncei>, as illustrated by block 212. In some embodiments, storing may comprise of caching the PMKID-Tuple in volatile memory, in which case the procedure followed with respect to an initialization or reboot may be to empty the cache and commence operation with no stored values. In various other embodiments, storing may comprise storing the PMKID-Tuple in another way.

Figure 3:
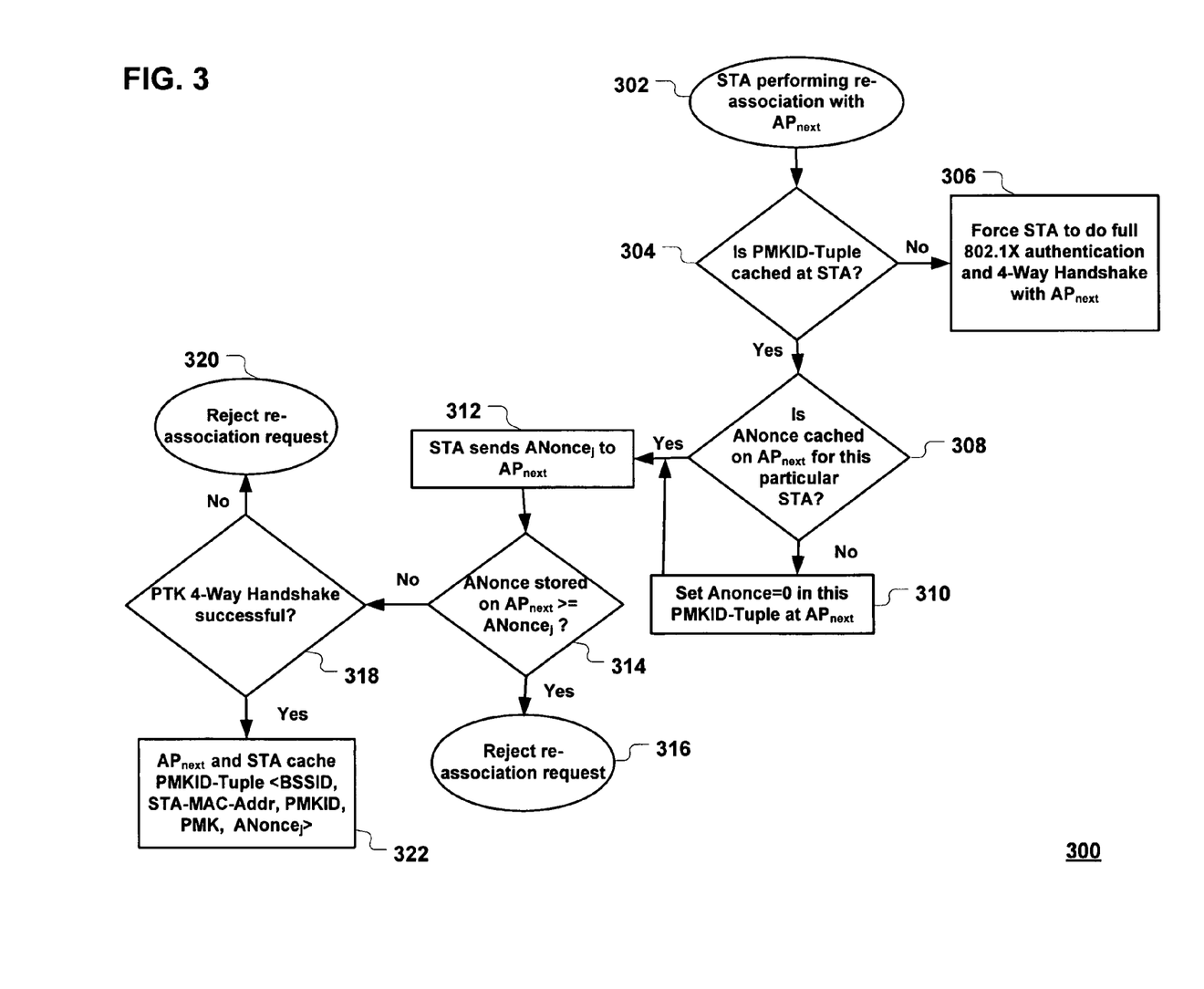
FIG. 3 is a flow diagram illustrating a portion of a method of operation in a communications node, in accordance with an embodiment of this invention.

FIG. 3 is a flow diagram illustrating a portion of a method of operation 300 in a communications node, in accordance with an embodiment of this invention. The operations illustrated in FIG. 3 may comprise operations in authenticating a communications device to a communications node. The operations illustrated in FIG. 3 in the context of APnext may be operations of or involving an Authenticator residing on a communications node, with the communications node comprising, in this example embodiment, an AP. In various embodiments, the Authenticator may reside on another device coupled to an AP. It is the Authenticator residing on APnext that is performing the operations indicated in terms of APnext in the example embodiment in FIG. 3. In various embodiments, the Authenticator may not reside on an AP, and thus the term, Authenticator, may take the place of the term, APnext, in describing the operations of such embodiments. Similarly, the operations illustrated in FIG. 3 in the context of a STA may be operations of a Supplicant residing on a communications device, such as a STA. In some embodiments, the Supplicant may not reside on a STA, but may, for example, reside on a device coupled to a STA.

As illustrated, the method may include block 302, where a communications device (here, a STA) is performing a re-association with a communications node (here, an AP denoted APnext). In this embodiment, the applicable PMKID is available at APnext. A re-association comprises a STA forming a connection with a second AP (for example, APnext) after having formed a connection with a first AP (for example, APfirst, as discussed with respect to FIG. 2). For example, this may occur in a wireless network when a STA is mobile and forms a network connection through APnext after having formed a connection through APfirst. The STA may seek to maintain a continuous session over the same LAN being accessed over APfirst and APnext. Another operation, as illustrated by block 304, may also include determining whether the applicable PMKID-Tuple is cached or stored at the STA performing a re-association with APnext. If the PMKID-Tuple is not cached or stored at the STA, the STA may be forced to undergo a full IEEE 802.1X standard, IEEE std. 802.1X-2001, approved Jun. 14, 2001, authentication and 4-Way Handshake with APnext, as illustrated in block 306. The term, 802.1X, will be used herein to refer to all IEEE 802.1X standards, including past, present, and future versions.

If the applicable PMKID-Tuple is cached or stored at the STA, whether an ANonce is cached or stored on APnext for the particular STA performing the re-association may be determined, as illustrate by block 308. If an ANonce is not cached or stored on APnext for this particular STA, APnext may set the ANonce to zero in this PMKID-Tuple, as illustrated by block 310. If an ANonce is cached or stored on APnext for this particular STA, the STA may send the ANonce, denoted ANoncej, to APnext, as illustrated by block 312. This operation may also occur after the operation of APnext setting the ANonce to zero in the applicable PMKID-Tuple, as illustrated by block 310.

An operation where the ANonce stored on APnext is checked to determine whether it is greater than or equal to ANoncej may be included, as illustrated by block 314. If the determination is positive, then the STA's re-association may be rejected, as illustrated by block 316.

An operation that involves a message exchange between the STA and APnext to derive a PTK may take place in a PTK 4-Way Handshake, the success of which may be determined, as illustrated by block 318. If the PTK 4-Way Handshake is not successful, the STA's association request to APnext may be rejected, as illustrated by block 320. If the PTK 4-Way Handshake is successful, APnext and the STA will both store the PMKID-Tuple, which may include the BSSID, the STA MAC Addr, the PMKID, the PMK, and ANoncej: PMKID-Tuple<BSSID, STA-MAC-Addr, PMKID, PMK, ANoncej>, as illustrated by block 322. In some embodiments, storing may comprise of caching the PMKID-Tuple in volatile memory, in which case the procedure followed with respect to an initialization or reboot may be to empty the cache and commence operation with no stored values. In various other embodiments, storing may comprise storing the PMKID-Tuple in another way.

Figure 4:
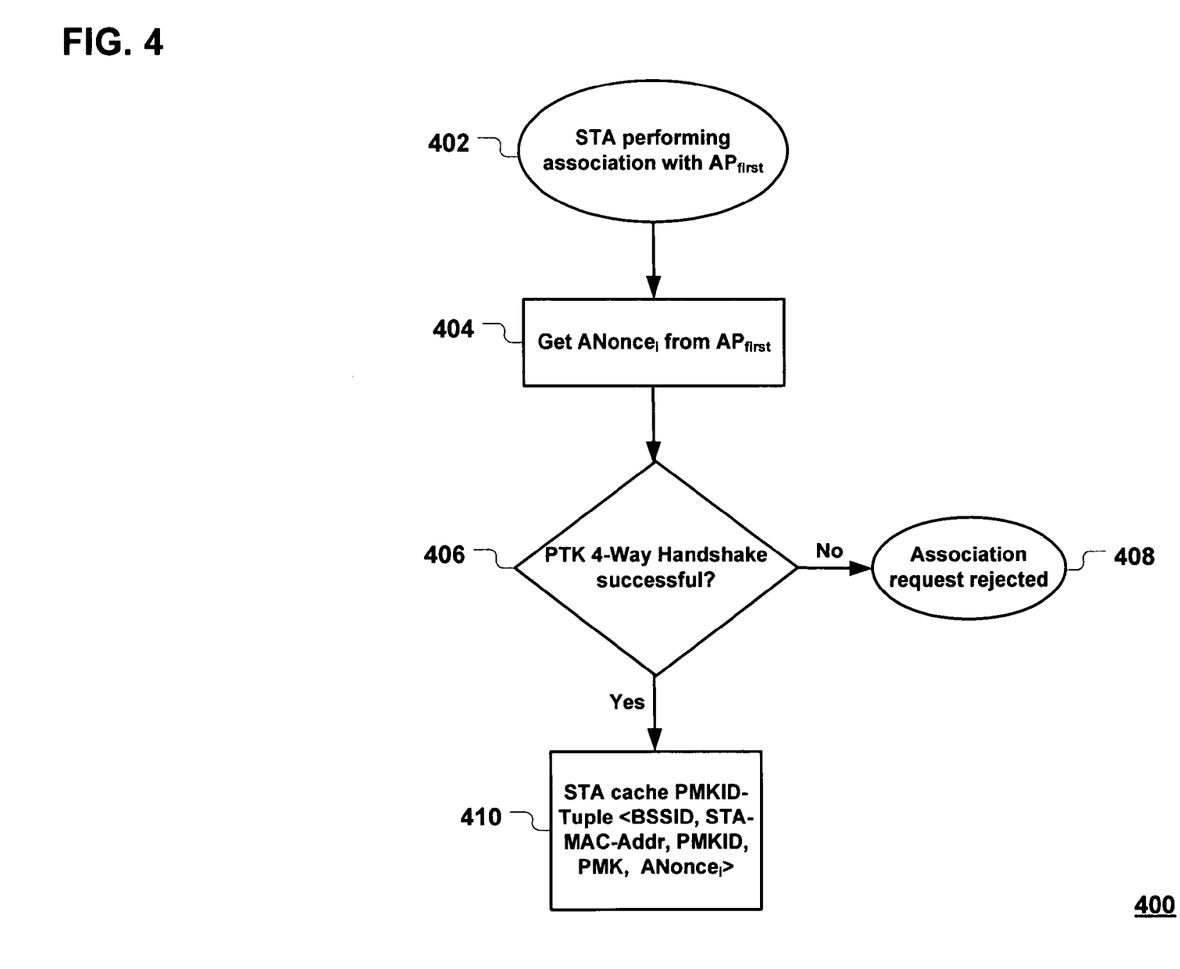
FIG. 4 is a flow diagram illustrating a portion of a method of operation in a communications device, in accordance with an embodiment of this invention.

FIG. 4 is a flow diagram illustrating a portion of a method of operation 400 in a communications device, in accordance with an embodiment of this invention. The operations illustrated in FIG. 4 may comprise operations in authenticating a communications device to a communications node. The operations illustrated in FIG. 4 in the context of APfirst may be operations of or involving an Authenticator residing on a communications node, with the communications node comprising, in this example embodiment, an AP. In various embodiments, the Authenticator may reside on another device coupled to an AP. It is the Authenticator residing on APfirst that is performing the operations indicated in terms of APfirst in the example embodiment in FIG. 4. In various embodiments, the Authenticator may not reside on an AP, and thus the term, Authenticator, may take the place of the term, APfirst, in describing the operations of such embodiments. Similarly, the operations illustrated in FIG. 4 in the context of a STA may be operations of a Supplicant residing on a communications device, such as a STA. In some embodiments, the Supplicant may not reside on a STA, but may, for example, reside on a device coupled to a STA.

As illustrated, the method may include block 402, where a communications device (here, a STA) is performing an association with a communications node (here, an AP denoted APfirst). Another operation may also include obtaining ANoncei from APfirst, as illustrated by block 404.

An operation that involves a message exchange between the STA and APfirst to derive a PTK may take place in a PTK 4-Way Handshake, the success of which may be determined, as illustrated by block 406. If the PTK 4-Way Handshake is not successful, the STA's association request to APfirst may be rejected, as illustrated by block 408. If the PTK 4-Way Handshake is successful, APfirst and the STA will both store the PMKID-Tuple, which may include the BSSID, the STA MAC Addr, the PMKID, the PMK, and ANoncei: PMKID-Tuple<BSSID, STA-MAC-Addr, PMKID, PMK, ANoncei>, as illustrated by block 410. In some embodiments, storing may comprise of caching the PMKID-Tuple in volatile memory, in which case the procedure followed with respect to an initialization or reboot may be to empty the cache and commence operation with no stored values. In various other embodiments, storing may comprise storing the PMKID-Tuple in another way.

Figure 5:
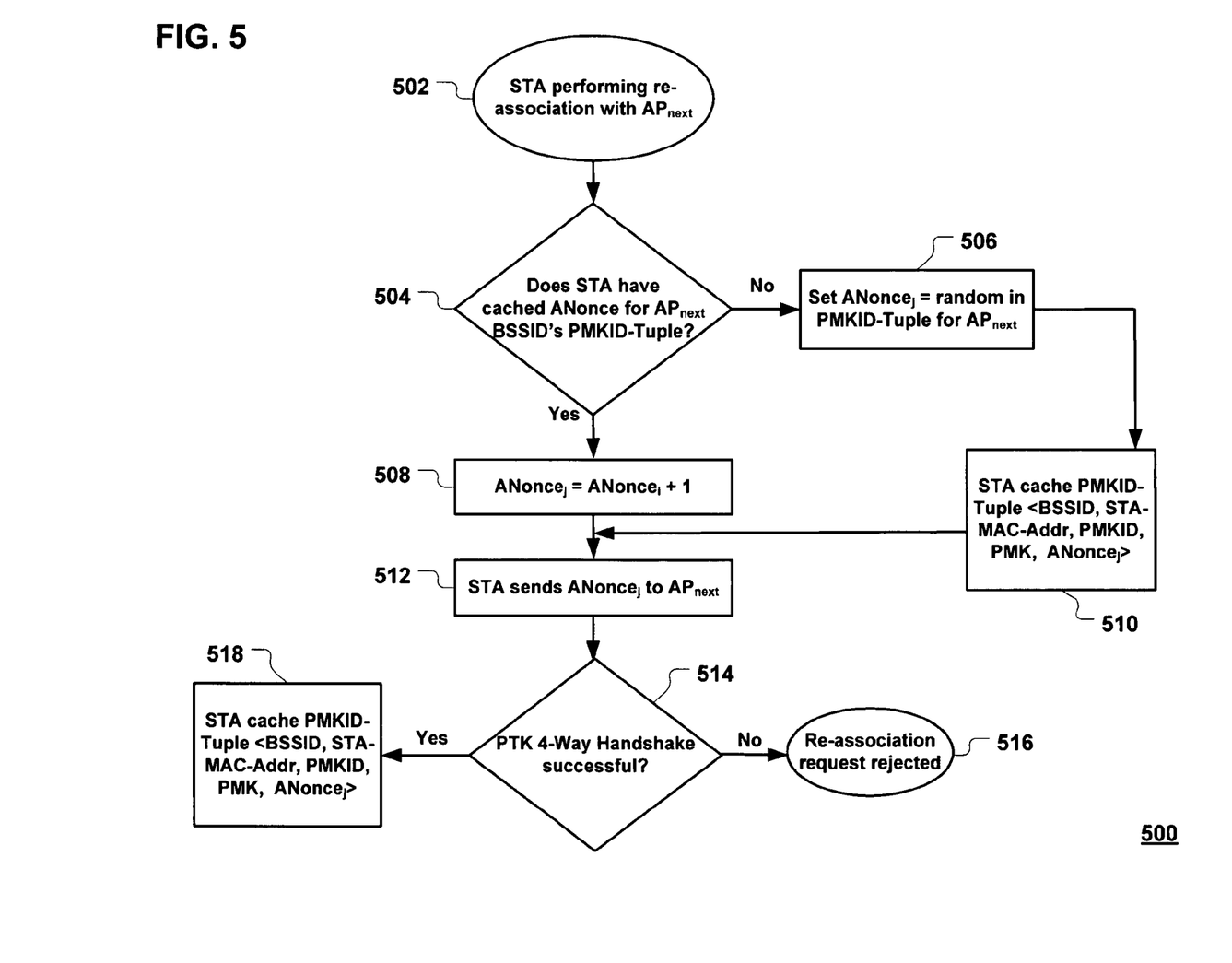
FIG. 5 is a flow diagram illustrating a portion of a method of operation in a communications device, in accordance with an embodiment of this invention.

FIG. 5 is a flow diagram illustrating a portion of a method of operation 500 in a communications device, in accordance with an embodiment of this invention. The operations illustrated in FIG. 5 may comprise operations in authenticating a communications device to a communications node. The operations illustrated in FIG. 5 in the context of APnext may be operations of or involving an Authenticator residing on a communications node, with the communications node comprising, in this example embodiment, an AP. In various embodiments, the Authenticator may reside on another device coupled to an AP. It is the Authenticator residing on APnext that is performing the operations indicated in terms of APnext in the example embodiment in FIG. 5. In various embodiments, the Authenticator may not reside on an AP, and thus the term, Authenticator, may take the place of the term, APnext, in describing the operations of such embodiments. Similarly, the operations illustrated in FIG. 5 in the context of a STA may be operations of a Supplicant residing on a communications device, such as a STA. In some embodiments, the Supplicant may not reside on a STA, but may, for example, reside on a device coupled to a STA.

As illustrated, the method may include block 502, where a communications device (here, a STA) is performing a re-association with a communications node (here, an AP denoted APnext). For example, this may occur in a wireless network when a STA is mobile and forms a network connection through APnext after having formed a connection through APfirst. The STA may seek to maintain a continuous session over the same LAN being accessed over the first and second APs. Another operation, as illustrated by block 504, may include a determination of whether the STA has a cached or stored ANonce for APnext BSSID's PMKID-Tuple. If there is a positive determination, an operation where ANoncej is set equal to ANoncei plus one may be included, as illustrated in block 508. If there is a negative determination, an operation where ANoncej is set equal to a random value in the PMKID-Tuple for APnext may be included, as illustrated in block 506. The method may also include an operation where the STA caches or stores the PMKID-Tuple, which may include the BSSID, the STA MAC Addr, the PMKID, the PMK, and ANoncej: PMKID-Tuple<BSSID, STA-MAC-Addr, PMKID, PMK, ANoncej>, as illustrated by block 510.

Following the operation in either block 508 or block 510, an operation where the STA sends ANoncej to APnext may occur, as illustrated by block 512. An operation that involves a message exchange between the STA and APnext to derive a PTK may take place in a PTK 4-Way Handshake, the success of which may be determined, as illustrated by block 514. If the PTK 4-Way Handshake is not successful, the STA's association request to APnext may be rejected, as illustrated by block 516. If the PTK 4-Way Handshake is successful, the STA will store the PMKID-Tuple, which may include the BSSID, the STA MAC Addr, the PMKID, the PMK, and ANoncej: PMKID-Tuple<BSSID, STA-MAC-Addr, PMKID, PMK, ANoncej>, as illustrated by block 518. In some embodiments, storing may comprise of caching the PMKID-Tuple in volatile memory, in which case the procedure followed with respect to an initialization or reboot may be to empty the cache and commence operation with no stored values. In various other embodiments, storing may comprise storing the PMKID-Tuple in another way. In various embodiments, if the value of the ANonce exceeds its permissible size, the ANonce may be set to zero and a new PMK may be provisioned.

Figure 6:
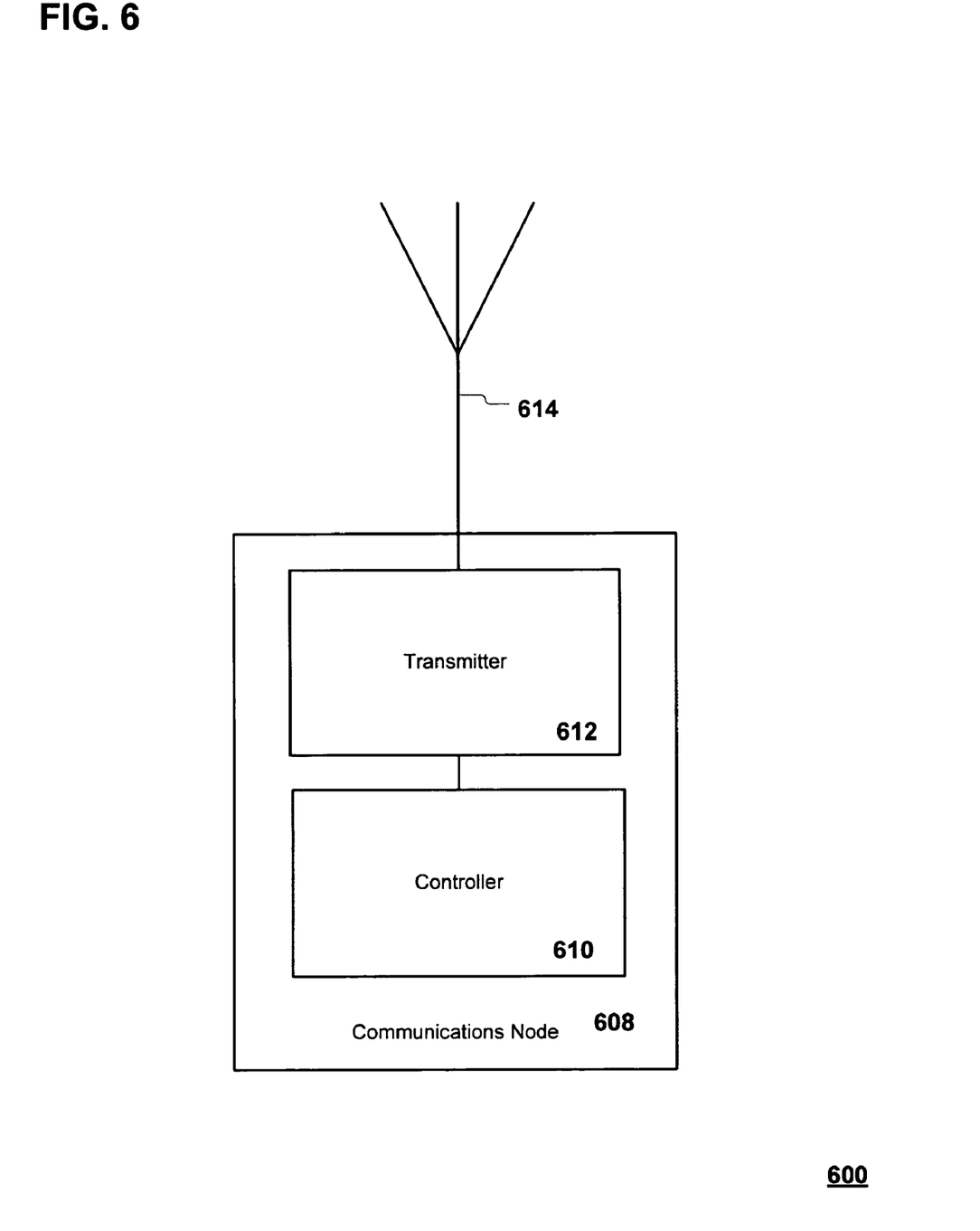
FIG. 6 illustrates some components of a communications system, in accordance with an embodiment of this invention.

FIG. 6 illustrates some components of a communications system 600, in accordance with an embodiment of this invention. In various embodiments, communications system 600 may include one or more substantially omnidirectional antenna(e), represented by antenna 614. Antenna 614 may be designed to at least facilitate transmission of communications signals. In some embodiments, communications system 600 may include one such antenna. In some other embodiments, communications system 600 may include two or more such antennae, for example to provide a spatial division multiple access (SDMA) system or a multiple input, multiple output (MIMO) system. In various embodiments, one or more of the one or more substantially omnidirectional antennae may comprise a dipole antenna. In various other embodiments, a dipole antenna may not be used. In various embodiments, different types of substantially omnidirectional antennae may be used, including different types of antennae for the same communications system.

In various embodiments, communications system 600 may include communications node 608. In various embodiments, communications node 608 may include controller 610. In various embodiments, communications node 608 may include transmitter 612. In some embodiments, transmitter 612 may be coupled to at least one of the one or more antennae, represented by antenna 614.

In various embodiments, controller 610 may be coupled to transmitter 612. Controller 610 may be designed to generate a first value for use in the derivation of a first encryption key, the first encryption key being at least partially used to authenticate the access of a device (not shown) to communications node 608 in a first communications exchange. Controller 610 may be designed to modify, independent of the device, the first value to create a second value, with controller 610 designed to use the second value in authenticating the access of the device to communications node 608 in a second communications exchange.

In some embodiments, controller 610 may be coupled to a controller readable medium (not shown) comprising a storage medium having a plurality of instructions stored therein designed to perform at least some of the operations described herein. In some embodiments, controller 610 may include a controller readable medium (not shown) comprising a storage medium having a plurality of instructions stored therein designed to perform at least some of the operations described herein. In various embodiments, the storage medium may comprise of any type of storage medium, including electronic memory, magnetic memory, or any type of past, present, or future storage medium consistent with the principles of an embodiment of this invention.

Controller 610 may be designed to use the second value in the derivation of a second encryption key, the second encryption key being at least partially used to authenticate the access of the device to communications node 608 in the second communications exchange. The first value may be a random or a pseudo-random value. In various embodiments, the authentication process may be performed in whole or in part under the 802.11i standard. For example, the derivation of the first encryption key may be an 802.11i PTK derivation in some embodiments.

In some embodiments, communications system 600 may act as an AP. In some embodiments, the device discussed in relation to FIG. 6 may comprise a STA. In various embodiments, communications system 600 may be included in at least part of a wireless network. In various embodiments, such a wireless network may at least partially comprise an 802.11 compliant or compatible network. In various embodiments, communications system 600 may comprise or be integrated into an 802.11 compliant or compatible access point. In various embodiments, communications system 600 may be integrated in any number of electronic devices to augment the electronic devices' abilities. Such electronic devices may include, for example, a personal computer, a set-top box, a game console, a video display, a digital versatile disk (DVD) player, a home entertainment console, etc.

Thus, it can be seen from the above description, a method of authenticating a device's access to a communications node is described. The method of operation includes the communications node generating a first value for use in the derivation of a first encryption key, the first encryption key being at least partially used to authenticate the device's access to the communications node in a first communications exchange. The method of operation includes the communications node modifying the first value, independent of the device, to create a second value. The method includes the communications node using the second value in authenticating the device's access to the communications node in a second communications exchange. Embodiments of the present invention include but are not limited to communications nodes and devices, subsystems, and systems equipped to operate in the above-described manner. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A method of re-authenticating a device's access to a communications node, the method comprising:
generating by the communications node, a first ANonce for use in derivation of a first pair-wise transient key (PTK);
authenticating by the communication node, in a first communications exchange, the device's access to the communication node using at least partially the first PTK;
storing by the communication node, the first ANonce;
associating by the communication node, with the device by establishing a communication link between the communication node and the device based at least in part on said authenticating; and
subsequent to a duration of time during which the communication node and the device are not associated, re-associating by the communication node with the device by re-establishing the communication link between the communication node and the device, wherein the duration of time occurs subsequent to said associating, wherein said re-associating further comprises:
modifying by the communications node, independent of the device, the first ANonce stored in the communication node to create a second ANonce; and
re-authenticating by the communication node, in a second communications exchange, the device's access to the communication node using at least partially the second ANonce.

2. The method of claim 1, wherein said re-authenticating comprises the communication node using the second ANonce to derive a second PTK, the second PTK being at least partially used to authenticate the device's access to the communications node in the second communications exchange.

3. The method of claim 1, wherein the first ANonce is a random or a pseudo-random value.

4. The method of claim 1, wherein said modifying of the first ANonce comprises incrementing by the communication node, independent of the device, the first ANonce to create the second ANonce.

5. The method of claim 1, wherein said modifying of the first ANonce comprises incrementing by the communication node, independent of the device, the first ANonce to create the second ANonce, such that the second ANonce=the first ANonce+1.

6. The method of claim 1, wherein the communications node is an 802.11 compliant or compatible access point.

7. The method of claim 1, wherein a derivation of the first PTK is an 802.11i Pair-wise Transient Key derivation.

8. A method of re-authenticating a device's access to a communications node, the method comprising:
communicating, by the device with the communications node in a first communications exchange, the device being authenticated to the communications node using a first pair-wise transient key (PTK) derived from a first ANonce generated by the communications node;
storing by the device, the first ANonce;
establishing by the device, a communication link with the communication node based at least in part on the device being authenticated to the communications node;
terminating by the device, the communication link between the device and the communication node subsequent to establishing the communication link; and
re-establishing by the device, the communication link with the communication node subsequent to said termination, said re-establishing comprising:
modifying by the device, independent of the communications node, the first ANonce to create a second ANonce; and
communicating by the device, with the communications node in a second communications exchange, using the second ANonce, the device being re-authenticated to the communications node using a copy of the second ANonce independently generated by the communications node.

9. The method of claim 8, wherein said modifying of the first ANonce comprises incrementing by the device, independent of the communications node, the first ANonce.

10. The method of claim 8, wherein the device is an 802.11 compliant or compatible station.

11. A communications node comprising:
a transmitter; and
a controller coupled to the transmitter, the controller designed to:
generate a first ANonce for use in derivation of a first pair-wise transient key (PTK), the first PTK being at least partially used to authenticate a device's access to the communications node in a first communications exchange,
store the first ANonce in the communication node;
associate with the device by establishing a communication link between the communication node and the device based at least in part on authenticating the device's access to the communications node; and
subsequent to a duration of time during which the communication node and the device are not associated, re-associate with the device by re-establishing the communication link between the communication node and the device, wherein the duration of time occurs subsequent to said associating, wherein during said re-associating, the controller is further designed to:
modify, independent of the device, the first ANonce to create a second ANonce, the controller designed to use the second ANonce in re-authenticating the device's access to the communications node in a second communications exchange.

12. The communications node of claim 11, wherein the controller is designed to use the second ANonce in the derivation of a second PTK, the second PTK being at least partially used to authenticate the device's access to the communications node in the second communications exchange.

13. The communications node of claim 11, wherein the first ANonce is a random or a pseudo-random value.

14. The communications node of claim 11, wherein the controller is designed to modify the first ANonce, independent of the device, by incrementing the first ANonce.

15. The communications node of claim 11, wherein the communications node is an 802.11 compliant or compatible access point.

16. The communications node of claim 11, wherein the controller is designed to derive the first PTK using an 802.11i Pair-wise Transient Key derivation.

17. A method of comprising:
associating a wireless station (STA) with a first access point (AP);
re-associating the STA with a second AP subsequent to associating with the first AP, said re-associating including:
determining, by the STA, that a pair-wise master key identifier (PMKID) tuple associated with the second AP has been cached at the STA prior to an initiation of said re-associating with the second AP, wherein the PMKID tuple includes a first ANonce and a basic service set identifier (BSSID) of the second AP, wherein the PMKID tuple associated with the second AP is cached at the STA from a previous association of the STA with the second AP, said previous association occurring prior to an initiation of said associating with the first AP, wherein during said previous association the STA establishes a communication link with the second AP;
modifying, by the STA, independent of the second AP, the first ANonce to create a second ANonce in response to at least in part on said determining; and
communicating, by the STA, the second ANonce to the second AP for being re-associated with the second AP.

18. The method of claim 17, wherein said modifying comprises incrementing the first ANonce to create the second ANonce.

19. The method of claim 17, wherein said re-associating with the second AP further comprises:
caching, by the STA, a second PMKID tuple associated with the second AP, to be used during a future re-association with the second STA, the second PMKID tuple including the second ANonce and the BSSID of the second AP.

20. A method of re-authenticating a wireless station's (STA's) access to a first access point (AP), comprising:
determining, by the first AP, that a pair-wise master key identifier (PMKID) tuple has been cached in the first AP prior to an initiation of said re-authenticating, during a previous association of the STA with the first AP, wherein during said previous association the STA establishes a communication link with the first AP, the PMKID including a media access control (MAC) address of the STA and a first ANonce associated with said STA;
receiving, by the first AP, a second ANonce from the STA;
comparing, by the first AP, the received second ANonce with the first ANonce included in the cached PMDIK tuple; and
re-authenticating, by the first AP, the STA's access to the first AP based at least in part on said comparing.

21. The method of claim 20, further comprising:
caching, by the first AP, a second PMKID tuple associated with the STA, to be used during a future re-authentication of the STA to the first AP, the second PMKID tuple including the second ANonce, a basic service set identifier (BSSID) of the second AP, and the MAC address of the STA.

22. The method of claim 20, wherein the PMKID tuple is cached in the first AP during a prior authentication of the STA's access to the first AP, the prior authentication occurring prior to the initiation of said re-authentication.

* * * * *

UNITED STATES PATENT AND TRADEMARK OFFICE
CERTIFICATE OF CORRECTION

PATENT NO. : 7,624,271 B2 Page 1 of 1
APPLICATION NO. : 11/090822
DATED : November 24, 2009
INVENTOR(S) : Sood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Twenty-sixth Day of October, 2010

David J. Kappos
*Director of the United States Patent and Trademark Office*